(12) United States Patent
Westphal (10) Patent No.: US 6,928,446 B2
(45) Date of Patent: Aug. 9, 2005

(54) SYSTEM AND METHOD FOR DATA STORAGE AND RETRIEVAL

(75) Inventor: Geoffry A. Westphal, Park Ridge, IL (US)

(73) Assignee: W. W. Grainger, Inc., Lake Forest, IL (US)

(*) Notice: Subject to any disclaimer, the term of this patent is extended or adjusted under 35 U.S.C. 154(b) by 0 days.

(21) Appl. No.: 10/640,940

(22) Filed: Aug. 14, 2003

(65) Prior Publication Data

US 2004/0093330 A1 May 13, 2004

Related U.S. Application Data

(63) Continuation of application No. 09/625,576, filed on Jul. 25, 2000, now Pat. No. 6,651,052.
(60) Provisional application No. 60/163,832, filed on Nov. 5, 1999.

(51) Int. Cl.[7] .............................................. G06F 17/00
(52) U.S. Cl. ................... 707/101; 707/102; 707/103 R; 707/104.1
(58) Field of Search .................... 707/1–10, 100–104.1, 707/200–205; 715/500.1–510

(56) References Cited

U.S. PATENT DOCUMENTS 6,023,696 A * 2/2000 Osborn et al. ................. 707/3
6,052,687 A * 4/2000 Miura et al. ................ 707/100

* cited by examiner

Primary Examiner—Jean M. Corrielus
Assistant Examiner—Isaac M. Woo
(74) Attorney, Agent, or Firm—Gary R. Jarosik (57) ABSTRACT

An improved method for creating and searching data files in a database is described. The system and method uses a memory in which is stored a main data file having a plurality of data records each having a data field containing data representative of an alpha-numeric product descriptor. A bitmask generator generates a bitmask value representative of the data in the data field of each data record and appends to each data record stored in the memory a bitmask data field containing the bitmask value representative of the data in the data field of the corresponding data record. A prefix generator generates a plurality of prefix files that are stored in the memory, the prefix files including a copy of selected data records of the main data file, the data records being selected as a function of the prefix of the alpha-numeric product descriptors corresponding to the data in the data fields of the data records. In performing a search to obtain information, both the appended main data file and the prefix files are available to the searching procedure.

13 Claims, 4 Drawing Sheets

FIG. 1

| ITEM NUMBER | CATEGORY | BRAND NAME | SUBCATEGORY | ITEM DESCRIPTION | ITEM CROSS REFERENCE MFG | ITEM CROSS REFERENCE NUMBER | BITMASK FIELD1 | BITMASK FIELD2 | BITMASK FIELD3 |
|---|---|---|---|---|---|---|---|---|---|
| 1a123 | Outdoor equipment | Sherman | Lawn and garden | Brass sprinkler | XYZ | 25 | 0x03 | 0x03 | 0x03 |
| 1a124 | Business equipment | 3M | Office supplies | Desk stapler | Home Depot | 555-4-4 | 0x01 | 0x01 | 0x04 |
| 2p100 | Outdoor equipment | Dayton | Lawn and garden | Lawn rake | XYZ | 234443 | 0x03 | 0x02 | 0x05 |
| 3k015 | Pumps | Dayton | Heavy duty pumps | 10 GPM centrifugal pump | McMaster | 100-pr4 | 0x04 | 0x02 | 0x01 |
| 5x808 | Motors | Dayton | TEFC motors | Appliance motor 300 RPM | Emerson | 345-35-3 | 0x02 | 0x02 | 0x02 |

UNIQUE BITMASK VALUES (for clarity)

| CATEGORY | BITMASK VALUE |
|---|---|
| Business equipment | 0x01 |
| Motors | 0x02 |
| Outdoor equipment | 0x03 |
| Pumps | 0x04 |

| BRAND NAME | BITMASK VALUE |
|---|---|
| 3M | 0x01 |
| Dayton | 0x02 |
| Sherman | 0x03 |

| SUBCATEGORY | BITMASK VALUE |
|---|---|
| Heavy duty pumps | 0x01 |
| TEFC motors | 0x02 |
| Lawn and garden | 0x03 |
| Office supplies | 0x04 |
| Lawn and garden | 0x05 |

FIG. 2

| Main Data File Record # | Bitmask Field 1 | Bitmask Field 2 | Bitmask Field 3 | |
|---|---|---|---|---|
| 1 | 0x00000003 | 0x00000003 | 0x00000003 | n records in Main Data File |
| 2 | 0x00000001 | 0x00000001 | 0x00000004 | |
| 3 | 0x00000003 | 0x00000002 | 0x00000005 | |
| 4 | 0x00000004 | 0x00000002 | 0x00000001 | |
| 5 | 0x00000002 | 0x00000002 | 0x00000002 | |
| n | 4-byte field | 4-byte field | 4-byte field | |
| | M fields selected by Operator of Bitmask Generator | | | |

NOTES: n Bitmask records (fixed length)
4 bytes per Bitmask Field
M field
Bitmask file size=n*4*M bytes

FIG. 3

FILE 1A.TXT

| ITEM NUMBER | CATEGORY | BRAND NAME | SUBCATEGORY | ITEM DESCRIPTION | ITEM CROSS REFERENCE MFG | ITEM CROSS REFERENCE NUMBER | BITMASK FIELD1 | BITMASK FIELD2 | BITMASK FIELD3 |
|---|---|---|---|---|---|---|---|---|---|
| 1A123 | Outdoor equipment | Sherman | Lawn and garden | Brass sprinkler | XYZ | 1B-25 | 0x03 | 0x03 | 0x03 |

FILE 1B.TXT

| ITEM NUMBER | CATEGORY | BRAND NAME | SUBCATEGORY | ITEM DESCRIPTION | ITEM CROSS REFERENCE MFG | ITEM CROSS REFERENCE NUMBER | BITMASK FIELD1 | BITMASK FIELD2 | BITMASK FIELD3 |
|---|---|---|---|---|---|---|---|---|---|
| 1a123 | Outdoor equipment | Sherman | Lawn and garden | Brass sprinkler | XYZ | 1B-25 | 0x03 | 0x03 | 0x03 |

FILE SH.TXT

| ITEM NUMBER | CATEGORY | BRAND NAME | SUBCATEGORY | ITEM DESCRIPTION | ITEM CROSS REFERENCE MFG | ITEM CROSS REFERENCE NUMBER | BITMASK FIELD1 | BITMASK FIELD2 | BITMASK FIELD3 |
|---|---|---|---|---|---|---|---|---|---|
| 1a123 | Outdoor equipment | Sherman | Lawn and garden | Brass sprinkler | XYZ | 25 | 0x03 | 0x03 | 0x03 |

FILE SPR.TXT

| ITEM NUMBER | CATEGORY | BRAND NAME | SUBCATEGORY | ITEM DESCRIPTION | ITEM CROSS REFERENCE MFG | ITEM CROSS REFERENCE NUMBER | BITMASK FIELD1 | BITMASK FIELD2 | BITMASK FIELD3 |
|---|---|---|---|---|---|---|---|---|---|
| 1a123 | Outdoor equipment | Sherman | Lawn and garden | Brass sprinkler | XYZ | 25 | 0x03 | 0x03 | 0x03 |

FIG. 4

SYSTEM AND METHOD FOR DATA STORAGE AND RETRIEVAL

This application claims priority to U.S. Provisional Application Ser. No. 60/163,832 filed on Nov. 5, 1999.

BACKGROUND OF THE INVENTION

This invention relates generally to database management and, more particularly, relates to an improved method for creating and searching data files in a database.

In the prior art, commercial databases are well known. Commercial databases are general tools created for a wide variety of activities such as, for example, performing arbitrary complex queries on data, on-line transaction updates, on-line information retrieval, batch report generation, database schema creation, database schema modification, table indexing, and data integrity. Typically, all of these activities occur for multiple simultaneous users.

The performance of the above described activities in currently implemented databases typically rely on the following philosophies:

(a) Information stored in a database is often times stored in human-readable format;

(b) To minimize disk space, key data is only stored once;

(c) The database is designed for an overall acceptable performance level for all activities, e.g., queries, updates, adds and deletes; and (d) Index tables into the database rely on the entire content of a key field. Unfortunately, the use of these philosophies in database management does have serious drawbacks. For example, formatting data in human-readable form increases the time it takes a computer to perform a search. Furthermore, when a commercial database is updating, modifying, or deleting records, it has considerable overhead in maintaining up-to-date indexes of table integrity. Still further, the search of key fields is performed linearly requiring that an excess number of records be examined.

Additional problems have also been recognized in commercially known databases. In this regard, most commercially known databases are large and cumbersome. Furthermore, enterprise licenses and system administrators for such commercially known databases are expensive. In addition, while these databases are powerful, they cannot always be tuned or modified to produce the best overall performance for what otherwise is a simple task that needs to be performed over and over. Many of these systems also utilize data files that are organized in a manner that makes them difficult to transform to other platforms.

From the foregoing, it is evident that a need exists for an improved system and method for storing and retrieving data in a database.

SUMMARY OF THE INVENTION

In accordance with these needs, an improved system and method for storing and retrieving data in a database is provided. The described system and method is implemented in a manner that takes advantage of knowing ahead of time what the operating constraints and context are going to be like, what the nature of the data is like, and what the needs are of the customer utilizing the system. More particularly, the system utilizes the following philosophies:

(a) Data is stored in a bitmask form to provide more efficient searching, disk reading, and memory usage (bitmask content is preferably converted back to human readable formats at the very last moment for use by customers);

(b) Data files are created with a very large degree of redundancy to improve access times (since disk accesses are much slower than memory accesses, the system takes advantage of the fact that it is often times much easier and faster to discard a small amount of extra, incorrect information obtained in one disk access than to use numerous disk accesses to find an exact result);

(c) To minimize system overhead, the data is read-only such that there are no updates to prefix files once they are copied to disk (updates of new information would be available at given intervals, such as monthly, and would replace old prefix files); and (d) Instead of creating an index table telling the searching program where to look, a prefix file is utilized which allows the search engine to find the possible domain of matching records in a minimal number of disk accesses. The system also preferably utilizes data files that are simple flat-files which allows the system to be exceedingly portable across different platforms.

As will be appreciated from the detailed description that follows, the described database chooses the best balance of system resources like memory, CPU speed, and disk space to create a searching facility that responds quickly and helps customers find products they need when a keyword is supplied. Furthermore, the improved database minimizes certain undesirable situations that can occur in commercial databases. These situations include, for example, timing out (when response times are too long, the search engine may automatically cease assuming that an error occurred in the search), displaying and stopping the search after the first N matching records are found which prevents the customer from seeing what parts of the implied data hierarchy contained matching records, and indicating to the customer that their search is too vague or ambiguous when too many matching records are found.

A better understanding of the objects, advantages, features, properties and relationships of the invention will be obtained from the following detailed description and accompanying drawings which set forth an illustrative embodiment and which are indicative of the various ways in which the principles of the invention may be employed.

BRIEF DESCRIPTION OF THE DRAWINGS

For a better understanding of the invention, reference may be had to a preferred embodiment shown in the following drawings in which.

DETAILED DESCRIPTION

Figure 1:
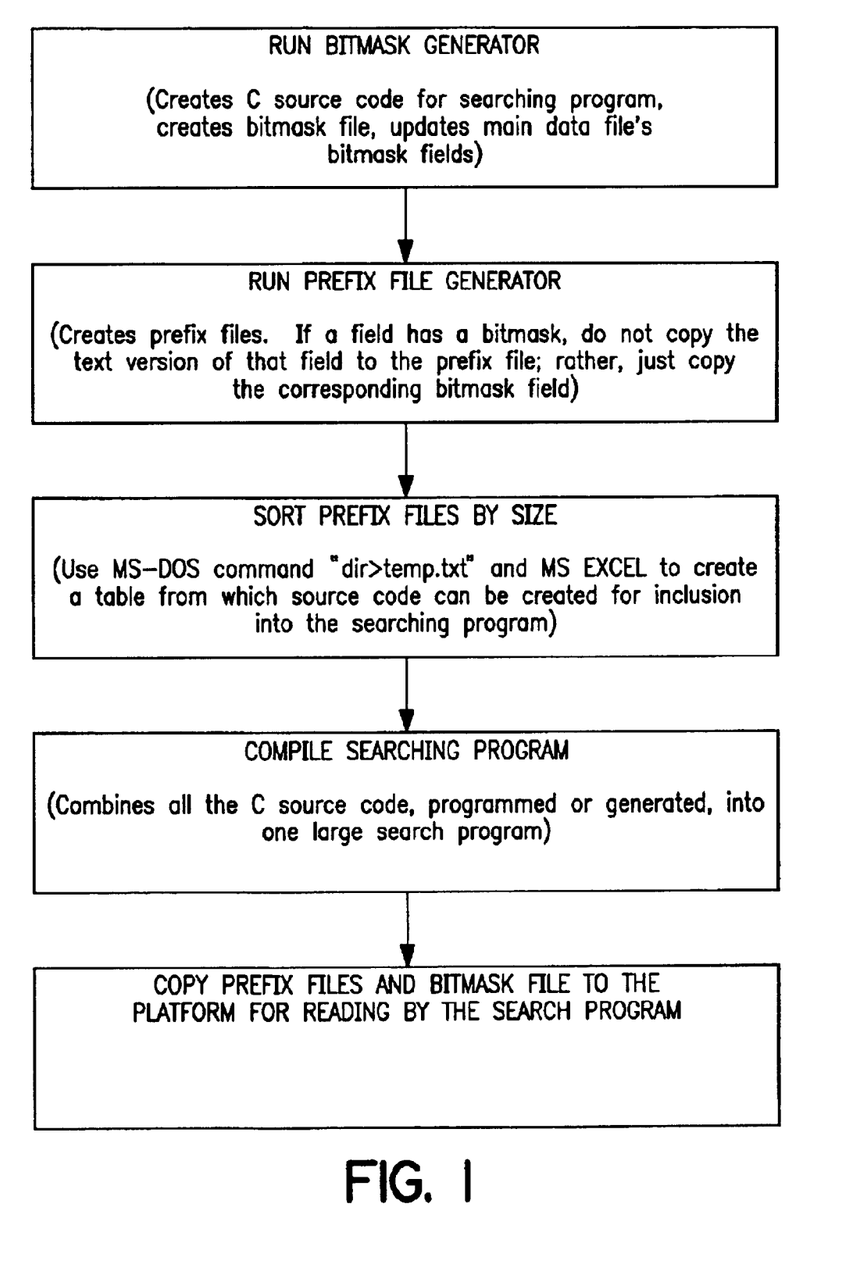
FIG. 1 is a flow chart diagram generally illustrating the steps for storing and retrieving data in a database in accordance with the invention.

Turning now to the figures, wherein like reference numerals refer to like elements, there is illustrated a system and method for storing and retrieving data. In particular, with reference to FIG. 1, the system and method relies upon a bitmask generator and searching program. While these components will be described in greater detail hereinafter, the next few paragraphs provide a general overview thereof.

The bitmask generator is preferably implemented as a software program that takes as an input a main data file which includes records of product information. The fields in the product information records may include a brand name, a product description, a manufacturer name, a manufacturer model number, a distributor model number, catalog page number, category, subcategory, etc. The Bitmask generator is concerned with removing the extra memory and disk space needed to store full text field values that occur frequently. For example, a 15-byte storage allocation for a State is fine when humans need to be able to read what State is in the field (e.g., Mississippi). However, only 1 byte is really needed since there are only 50 states in the Union and since a 1-byte field can take on as many as 256 different values. In this way, a search comparison of a 1-byte field is much faster than a search comparison for the original 15-byte field.

The program operator of the Bitmask Generator determines which fields they wish to convert to bitmasks. A table of unique values for each word or number contained in the field will be created for each of these fields. These tables are sorted alphabetically. The bitmask value for each record in each of the sorted tables is replaced with the binary representation of the record number (e.g., record #2 corresponds to a binary value of 00000010 or a hex value of 0×02). These bitmask values are then stored and retrieved by the prefix file generator and appended to the end of the records in each of the prefix files.

The bitmask generator, since it processes and assimilates the entire main data file, creates the following: 1) optimized memory allocation statements; 2) program statements to load data fields from the main data file into memory for use when generating HTML tables on the customer's screen; and 3) source code statements which set unique parameters used by the searching program. The main data file uniquely defines these parameters.

Turning now to the searching program, the searching program takes input from the customer. The input can be in the form of keywords. These keywords can be distributor stock numbers, distributor names, manufacturer stock numbers, manufacturer names, brand names, product description, and parametric attributes (e.g., 100 LBS, 3500 RPM, 120 Volts, 0.12 MIL, etc.). The input from the customer can also be in the form of clicks on categories, brand name, subcategories, or any other field the operator of the bitmask generator chooses.

The customer can initially supply a keyword or begin by clicking on a category. Subsequently, the customer can continue to click on categories, brand names, or subcategories to continue drilling down. Drilling down entails a refinement of the search. When a keyword is supplied, when a category is clicked, when a brand name is clicked, or when a subcategory is clicked, the number of records which match is always reduced. In this way, the customer is able to see what each particular refinement does to reduce the number of matching records. For example, supplying a keyword like "brass" is not particularly helpful in a database with lots of high-quality industrial supplies. Supplying keywords like "water nozzle" or by clicking on additional refinement parameters will cause the number of matching records to be reduced to a point where the customer is able to assimilate the remaining number of products and make a buying decision.

The searching program begins by looking to see if the customer has supplied any keywords. If no keywords have been supplied, the program determines which of the selectable fields have been clicked. Since the bitmask value of the parameter has already been determined, the searching program uses this bitmask to collect all other records that have a matching bitmask. For example, if the customer has clicked on the category "business equipment," the searching program looks for all bitmasks that contain the corresponding bitmask that represents "business equipment." This value is preferably part of the HTML document which gets displayed on the customer's screen. When the customer moves the mouse over "business equipment," the bitmask value is already there and is sent back to the searching program for the next search which now matches all items which have the same bitmask value of "business equipment." Once "business equipment" is selected, it cannot be selected again. The process of searching data by using bitmask values is much faster than searching data by utilizing actual keyword representations.

For each matching record, a tally is kept for all the other parameters (e.g., brand name, category, and subcategory) which are found in the matching records. That is to say, there are often many records which match a given parameter. By way of analogy, there are many types of bread from many different vendors in the bread aisle of a supermarket. In this way, the searching program can determine what other remaining brand names, categories, or subcategories to display to the customer for further refinements in the search. If the customer chooses to refine the search, the originally selected bitmask is again passed back to the searching program along with the next parameter selected by the customer. This process continues until that are no possible parameters to click on. Moreover, this process can continue with or without the customer entering keywords.

The process is similar when keywords are utilized. This is possible by appending bitmask fields to the end of the prefix file records. The searching program may examine up to the first three characters of each keyword (keywords are separated by SPACE characters). The searching program then examines a list of all prefix names. These prefix names have been sorted in ascending order based on the size of its corresponding prefix file. The searching program stops searching this prefix name list with the first match. It is important to note that there will always be a match in this prefix file list since all possible prefixes are in this list. Since the prefix file list was sorted in ascending order based on size, we are guaranteed to search the smallest file. For example, searching for the last name "Zephyr" in the phone book, name by name, starting with the first entry that starts with "ZE" is much faster than searching for the last name "Smith" by starting with the first entry that starts with "SM." This is because there are fewer last names that start with "ZE" than names that start with "SM." Furthermore, it is not important if any other additional keywords are supplied. Due to the redundancy of each record in the main data file which the prefix file generator moves out to the prefix files, it does not matter which prefix file you search. By searching the smallest file, superior performance of the search can be achieved.

By way of further example, if a customer where looking for a "plastic blue zipper," the searching program would gather the prefixed "PL," "BL" and "ZI." The Prefix file with the smallest size would be searched. While the searching program still looks for the matches for the keywords of "plastic," "blue" and "zipper," performing these three searches on the smallest number of records is most desirable. If the size of the prefix files in bytes were 340,000 for "PL," 140,000 for "BL" and 4,500 for "ZI," then the searching program would examine the "ZI" prefix file since this file has the smallest size. This means that the "ZI" file is searched for records which contain the keywords "plastic," "blue" and "zipper." The "ZI" file only has records which contain "ZI." Not all records, however, will contain "zipper" as some may contain other words, such as "zinc." Nevertheless, the number of records to consider for "plastic blue zipper" has been minimized greatly.

In further detail, the system is preferably implemented such that the main data file is in an ASCII format with records delineated with carriage returns and lines feeds, ASCII 13 and ASCII 10, respectively. The bitmask generator generates C source code. The C source code for the searching program uses the #include <filename.c> nomenclature. The C program runs on a UNIX platform such as Sun's SOLARIS brand platform. The output of the searching program is HTML and is designed to work with Internet browsers such as those produced by Netscape and Microsoft. It is preferred that the operator of the bitmask generator select three to five fields on which to create bitmask fields. Once the prefix files are generated, and once the bitmask file is generated, these files are copied out to the appropriate directory on the UNIX servers. For example, once the prefix files are created during the preprocess steps on a PC, these files are copied from one directory on the PC to the working directory on the production UNIX machine using a file copy utility or command, for example, FTP or the UNIX "cp" command. The bitmask generator, prefix filename size array generator and the prefix file generator may be implemented using CLIPPER, a compiled dBase derivative.

The preferred search starts with either a keyword or a click on a parameter. Continued drill-down searching, which means further refinement of the search and a continued reduction in the number of possible product matches, is possible by clicking on parameters (HTML links). When a threshold number of matching possibilities is achieved, record details can be viewed. These details are retrieved by performing physical disk seeks directly to the appropriate records. Since the number of displayable detail records is limited, the response time is improved.

Figure 2:
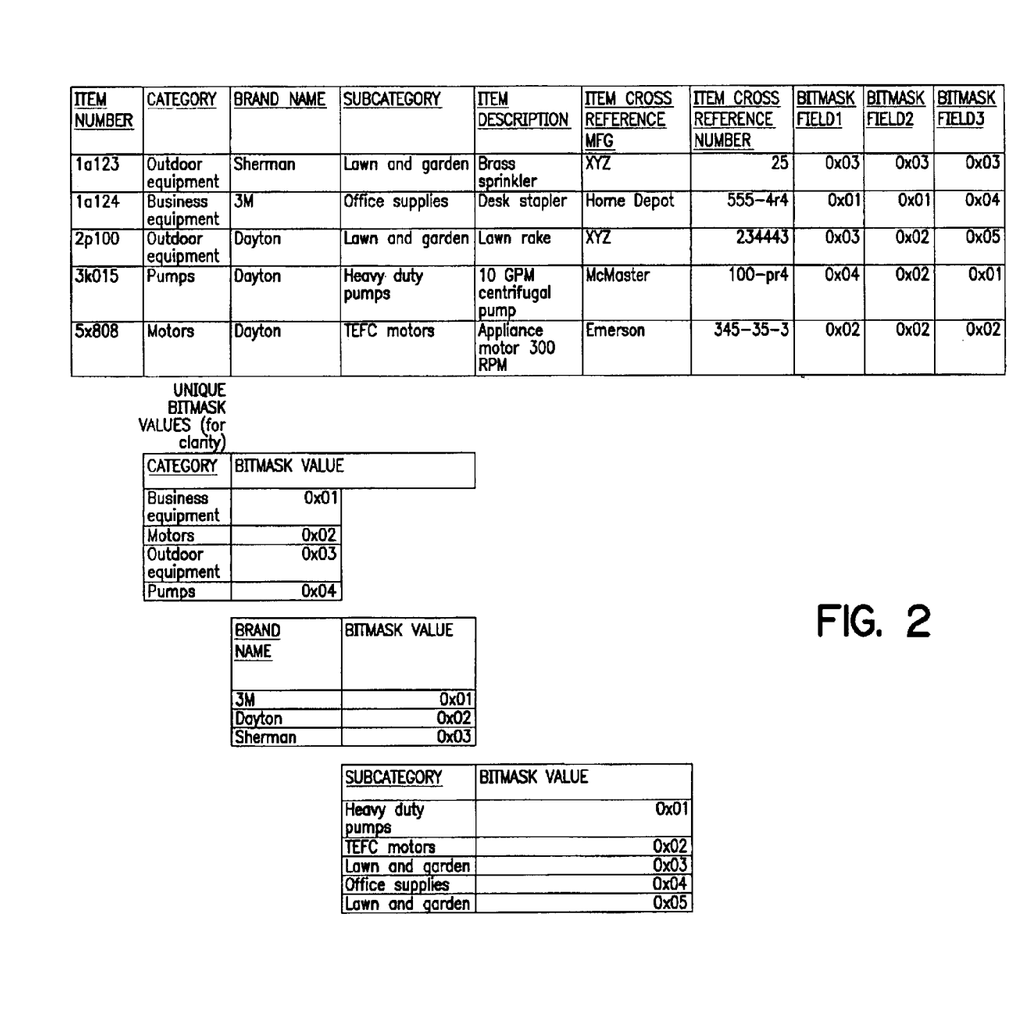
FIG. 2 is a diagram illustrating data fields in a representative main data file for use in connection with the database of FIG. 1.

In operation, the bitmask generator uses the main data file as input. As illustrated in FIG. 2, the format or file layout of the main data file includes several categories of fields. The operator chooses available fields that contain values that recur throughout the main data file and that a customer would select to help them find products. These are used to generate appropriate bitmasks. In the illustrated example, the field defined as "category" corresponds to a physical section in a paper catalog. This field has values like "business equipment," "outdoor equipment," "definite purpose motors," and "pumps." There should be only a few unique values in the "category" field (approximately 36 in a record of 80,000 entries). Preferably, the field is over 20 characters in length. This field size is convenient for storing information that needs to be assimilated by a human. However, as discussed previously, this arrangement is not desired when it comes to speed associated with searching. That is, searching a 20-byte field can be slow when searching for matches, especially for a limited number of unique values.

The bitmask generator examines the fields chosen by the operator of the bitmask generator as being useful in the search process. For each of these fields, the unique values are pulled out and stored in a table. This list of unique values is then sorted in ascending alphabetical order. The record number in each table of unique values then becomes the binary bitmask representation for that unique value. In FIG. 2, there is illustrated four unique values to the "category" field, i.e., "pumps," "outdoor equipment," "business equipment," and "motors." When this list is sorted, "business equipment" receives the bitmask 0x01, "motors" receives a bitmask value of 0x02, etc. These bitmask values are then stored in the corresponding bitmask field in the main data file.

If the operator of the bitmask generator selects four fields to generate bitmasks for, then there will be four bitmask fields in the main data file. This is illustrated in FIG. 2, which shows the unique values for each of the three fields "category," "brand name," and "subcategory" and the corresponding bitmask values. These bitmask values have been filled in the main data file layout for completeness.

Figure 3:
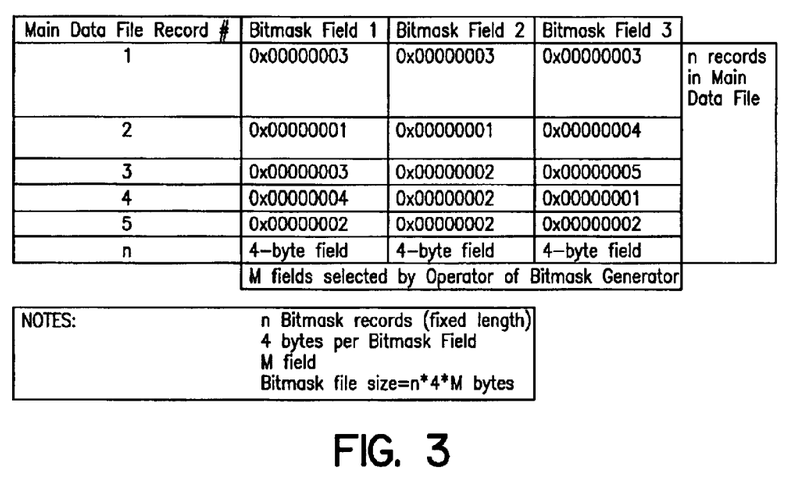
FIG. 3 is a diagram illustrating data fields in a representative bitmask file for use in connection with the database of FIG. 1.

Once all of the records of the main data file have been processed for the fields selected by the operator of the bitmask generator, the bitmask file is written out as a separate entity as illustrated in FIG. 3. For example, if M represents the number of bitmask fields, and N the number of records in the main data file, then a sequential filed is created whereby M bitmask fields are written out to a file for each of the N records. Moreover, each bitmask is a 4-byte value. In addition, once all of the records in the main data file have been processed, then three C source code segments are created. These C source code segments are unique to the main data file and the fields selected for bitmask generation by the operator of the bitmask generator.

The created C source code segments contains optimized memory allocation statements for input/output buffers and for the fields displayed in the item detail screens of the searching program. Since the memory allocation statements are generated, each version of the searching program is customized to have only the memory allocated that is needed. For example, if the item detail screen needs to have more fields displayed in the future, the bitmask generator will generate any additionally needed C source code statements. The searching program then only needs to be recompiled to affect these changes. Likewise, the buffer needed to read in the bitmask file in its entirety is also declared. The size of this buffer changes as the size of the main data file changes with the number of bitmask fields the bitmask generator operator chooses. The bitmask generator merely creates a new source code statement with a different number which represents the size of the buffer needed.

Some of these unique variables include in the memory assignment statements include the total number of items in the current main data file, number of unique category values, number of unique brand names, etc. Again, there is great convenience in the bitmask generator creating the C source code statements as the number of parameter fields change and as the number of fields change on the item detail screen. The programmer is free from having to reprogram and track where in the main data file the field information is located in each record. Moreover, these field sizes are only allocated as large as they have to be and reflect any changes from the previous main data file's field sizes. By having the bitmask generator create unique code segments, the searching program can be optimized and easily changed to uniquely reflect the data characteristics of the main data file. Furthermore, since the current business operating environment can accept product data being updated on a monthly basis, recompiling the searching program once per month would not be deemed an unacceptable task.

The prefix file generator is a program that creates all possible output files for the search program. These files are initially empty. All possible two-letter filenames are created from 00.TXT to ZZ.TXT. In this regard, there are 36 characters with which to begin a filename chosen from 26 letters and 10 numbers (0 to 9). Furthermore, there are 37 ways to create the second letter of the filename chosen from 26 letters, 10 numbers and the SPACE character. The SPACE character is replaced with the underscore character. Thus, there are 36×37 or 1,332 different two-character prefix file names.

Figure 4:
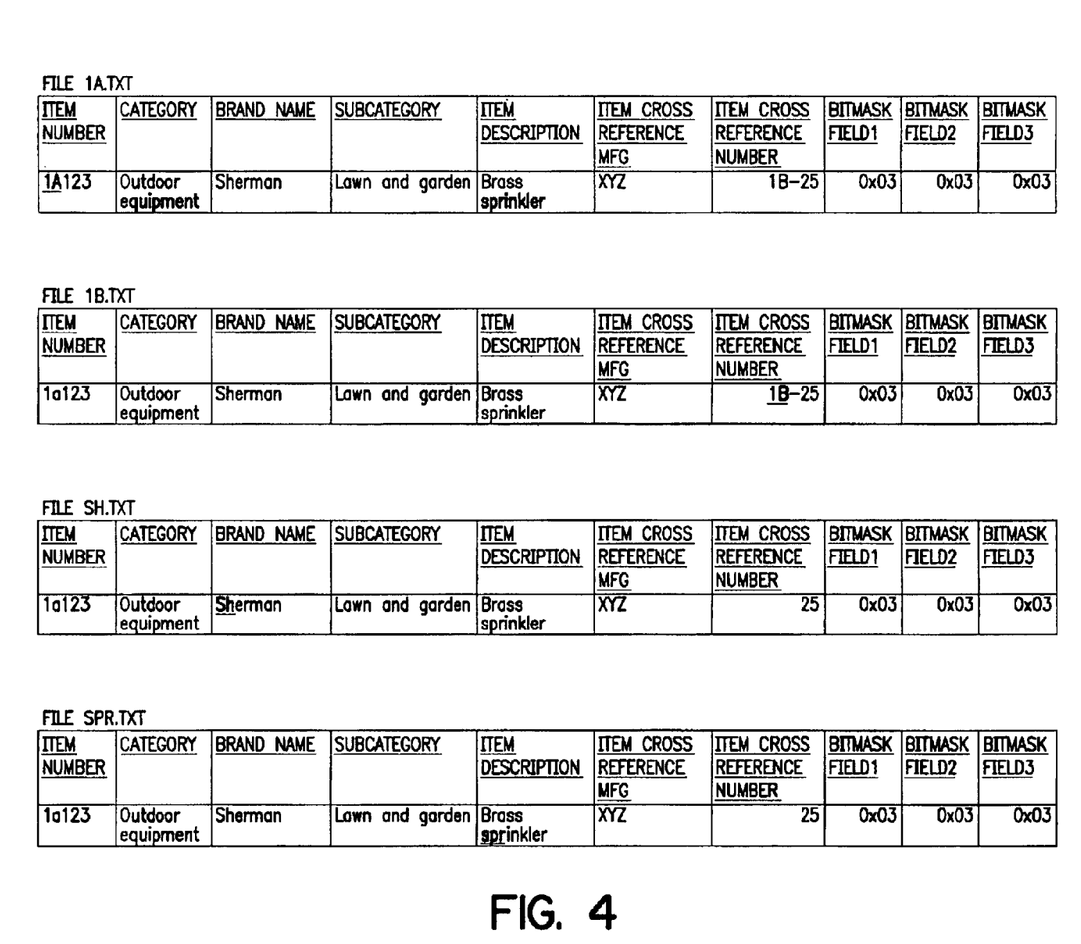
FIG. 4 is a diagram illustrating data fields in representative prefix files for use in connection with the database of FIG. 1.

The prefix file generator then uses as input the modified main data file. It examines all the fields for keywords. The fields in the main data file's records are information like "brand name," "product description," "catalog page number," "category," "subcategory," etc. Once a keyword is found, the prefix of this keyword is determined. For most cases, it is the first two characters of the word. In the case of a single character, the "_" character is appended to make a two-character prefix. One, two, three, four, etc. character prefixes may be used depending upon the number of records in the main data file. Turning to FIG. 4, an example is illustrated of how the 1A123 record is copied out to numerous prefix files, i.e., file 1A.TXT, file 1B.TXT, file SH.TXT, and file SPR.TXT.

A further example is if record #1 contained a product description of "green" "soap." Record #1 would then be written out to the GR.TXT prefix file. Moreover, record #1 would also be written out to the SO.TXT prefix file. Note that all alphanumeric combinations are handled sot that a record description of item 1ab23 would be written out to 4 different prefix files, namely, file 1I,TXT, file 1A.TXT, file 20.TXT, and file LB.TXT.

In particularly populated prefix files, the two-letter paradigm may be increased to three or even four letter prefixes. That is, a record with the words "so-so" "solenoid" and "sorter" would be written out to three different three-letter prefix files, namely, SO_.TXT, SOL.TXT, and SOR.TXT. This means that additional prefix file names can be created above and beyond the 1,332 two-character file names to aid in the distribution of work.

The above-described break down of the files advantageously provides great speed and searching simplicity when used in connection with the searching program. Both *Sorting and Searching*, Donald E. Knuth, 1973 by Addison-Wesley Publishing Company, Inc., pp. 486–487 and *Handbook of Algorithms and Data Structures*, G. H. Gonnet, 1984 by Addison-Wesley Publishers Limited; pp. 203–208 mention the distribution of words in the English language. This distribution breaks down the number of records to evaluate considerably. By capitalizing on this fact, searching a given prefix file necessarily guarantees working with records with a very high probability of containing a match for the customer's keyword.

Overall, each record in the main data file is examined. The number of keywords found in a main data file record varies directly with the number of times this record is copied out to a prefix file. This is one of the keys to efficient searching. For example, if the prefix file generator finds 10 keywords in one of the records in the main data file, then that record is copied out 10 times, once to each of the prefix files which corresponds to the first two or three letters of the beginning of that keyword.

Each prefix file receives only records that contain the prefix in one of the keywords or as an entire keyword. That is, the TU.TXT file always has at least one keyword in each and every record that has a keyword beginning with "tu." Thus, searching a specific prefix file guarantees that only relevant or mostly relevant records are being considered for a possible match. Due to the current state of the art in disk storage, the cost of large amounts of disk storage is almost trivial.

In performing a search, the search begins where the customer decides whether or not to use a keyword. Assuming that a customer does not select any keywords and commences the search by clicking on the "search now" button, the customer is displayed a list of all of the categories. The customer selects one of the displayed parameters with a mouse click. Since the bitmask generator has already assigned a value to each of the parameters, the HTML link for any given category link will already have the searching program arguments configured so that clicking on the link results in the search program looking for all records with that particular bitmask value. In this no-keyword example, the bitmask file is read in its entirety and examined to find all the category bitmasks that match the bitmask for the link that customer selected with the mouse. This method of searching is much faster than normal searching techniques because the search engine is only required to look at bitmasks which are smaller pieces of data than text descriptions or word identifiers for the products and because the entire bitmask file is read in its entirety into memory with as few as one disk access.

As the search program slides down the bitmask file, it tallies up which "brand name" and "subcategories" are represented when the category is locked down to the bitmask value the customer clicked on. Note that the customer is unaware of the bitmask value being associated with the English language text link on which the clicked. The screen that returns to the customer is one which contains the category locked down to the value the customer selected, and the remaining parameter choices for "brand names" and "subcategories" which correlate to the chosen bitmask value. The number of parameter choices for the "brand names" and "subcategories" is greatly reduced.

At this point, the customer may have the option to display item details for the matching products if the number of matches is below a predefined threshold. If the customer cannot display item details, the customer needs to continue refining their search by clicking on additional parameters in either the "brand name" group or "subcategory" group. Again, by clicking on another parameter, that link's bitmask values are already known and included with the first category's bitmask value and sent back to the searching program now as two arguments. Depending on the number of fields the operator of the bitmask generator selected, there can be more than three groups of parameters on which the customer can click. The arguments for the searching program are merely concatenated and sent back to the searching program. According to the preferred embodiment, if there are clickable parameters, the number of possible matching products is always reduced by clicking on another parameter. This notion of clicking on parameters and reducing the number of possible product matches is referred to as "drilldown" or "parametric" searching.

While the search progresses, the customer may be displayed as an active link the message "You have 'n' possible product matches." The customer can click on this link to receive detailed information about the matching products. The information about the matching products is easy to find in the main data file since each record in the prefix file has a field which contains the record number of that record's detailed information in the main data file. For example, if there are 12 possible matching products that a customer wants to see detail information on, then 12 disk accesses are needed to retrieve this information from the main data file.

The number of disk accesses is limited by the predetermined number of matching products that can be displayed by the search engine. In this way, system resources can be constrained to a desired lever. It is reasonable to assume that a customer cannot assimilate 60 records of detailed information in a manner that would assist the customer in the buying process. Therefore, 60 records is a desired level of threshold.

If the customer begins by entering one or more keywords, the searching program detects this and determines which of the prefix files needs to be examined. The prefix file generator was designed to create multiple copies of records in the main data file. This means that there are numerous prefix files that could be examined to find matching records with, or starting with, the customer's keyword or keywords. However, to increase efficiency, the search program has included in it a memory array that is sorted in ascending order, based on the prefix file byte count. This list has all the prefix file names already loaded in memory. The searching program examines each keyword, as delineated by blank spaces, and determines which two or three-letter filename prefix to consider for each keyword. This list of prefixes is compared to the sorted list of prefix file names in memory. A match within the prefix file name list always occurs since this prefix file name list contains all possible two and three-character prefix file names for any given main data file. When the first match occurs, the smallest prefix file name has been determined.

The selected prefix file is then processed record by record. Its fields are examine to see if any of then are or begin with the customer's keyword. If there is more than one customer keyword, then multiple comparisons are performed within each record of this prefix file. If there is a match, the this record is considered as having an item that may be an item that the customer is searching for. The prefix files contain bitmask representations of certain fields. As currently implemented, these fields are "category," "brand name," and "subcategory." Bitmask values are internally referring to ASCII character values that were loaded into the searching program. This means that the bitmask fields can also be searched for matching keywords. However, once we examine any given bitmask value, then no further character compares need to take place for this bitmask value since a flag can be set and very quickly examined to prevent additional resources for re-comparing this bitmask field. Again, bitmasks pay off with faster execution.

Once the first one or more keywords have been processed and searched for in the prefix file, the customer can either refine the search or retrieve item details if the number of matching records is below the predetermined threshold level. If the customer wants to refine the search further, they can select any clickable parameter link. And, as before, the bitmask value of the clicked-on parameter is concatenated to the search program argument list. This results in the search program being executed again, only this time with a bitmask value added to the original list of keyword(s). As noted above, adding additional search constraints, i.e., keywords or bitmasks, always reduces the number of matching products.

When there are keywords and bitmask values sent to the searching program, the searching program will always use the prefix files to search. Since the prefix files have copies of the records from the main data file, the prefix file records also have bitmask fields. Instead of having to perform multiple disk access by having to read the prefix filed and the stand-alone bitmask file, this invention appends the bitmask files to help reduce the number of disk accesses. Memory comparisons and non-disk activity typically occurs thousands, and possibly, millions of times faster than disk activity. The examination of the bitmask fields in the prefix files is exactly the same as the examination of bitmask fields performed in the no-keyword search described above.

From the foregoing, it will be appreciated that the described system and method for storing and retrieving data in a database has the advantages of eliminating the need for commercial databases, allowing updates of files to be performed easily and quickly, minimizing the occurrences of time-outs, providing good performance with traditional common graphical interface design, requiring minimal disk activity, providing a portable system, allowing quick changes to search categories without having to re-program the searching program, and eliminating those problems associated with the use of fuzzy logic search techniques.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

What is claimed is:

1. A method for searching for data records in a main data file having a plurality of data records wherein each data record includes one or more data fields and bitmask fields having a bitmask value indicative of data in a corresponding one of the data fields, the method comprising:

transmitting to a user a first mark-up language document having a first plurality of parameters that are selectable by a user, each of the first plurality of selectable parameters having an associated bitmask value;

in response to the user selecting one of the first plurality of selectable parameters of the first mark-up language document, receiving the bitmask value associated with the selected parameter of the first plurality of selectable parameters at a searching program;

transmitting to the user a second mark-up language document having a second plurality of parameters that are selectable by the user, each of the second plurality of selectable parameters having an associated bitmask value;

in response to the user selecting one of the second plurality of selectable parameters of the second mark-up language document, receiving the bitmask value associated with the selected parameter of the second plurality of selectable parameters at the searching program; and causing the searching program to select those data records of the plurality of data records in the main data file that have a bitmask value in a bitmask data field that matches both the bitmask value associated with the selected parameter of the first plurality of selectable parameters and the bitmask value associated with the selected parameter of the second plurality of selectable parameters whereby each data record so selected represents data for which the user searched.

2. The method as recited in claim 1, wherein the first and second plurality of selectable parameters are selectable by means of a mouse click.

3. The method recited in claim 1, wherein the first and second plurality of selectable parameters are representative of product descriptors.

4. The method as recited in claim 1, wherein the second plurality of selectable parameters comprises a subset of the first plurality of selectable parameters.

5. The method as recited in claim 1, wherein the first and second mark-up language documents have links for use in respectively selecting one of the first and second plurality of selectable parameters and the links include the bitmask values associated with the first and second plurality of selectable parameters.

6. The method as recited in claim 1, wherein the searching program selects those data records of the plurality of data records in the main data file that have a bitmask value in a bitmask data field that matches the bitmask value associated with the selected parameter of the first plurality of selectable parameters and the data in the data fields of the data records so selected function to define the second plurality of selectable parameters.

7. A computer-readable media having instructions for searching for data records in a main data file having a plurality of data records wherein each data record includes one or more data fields and bitmask fields having a bitmask value indicative of data in a corresponding one of the data fields, the instructions performing steps comprising:

transmitting to a user a first mark-up language document having a first plurality of parameters that are selectable by a user, each of the first plurality of selectable parameters having an associated bitmask value;

in response to the user selecting one of the first plurality of selectable parameters of the first mark-up language document, receiving the bitmask value associated with the selected parameter of the first plurality of selectable parameters at a searching program;

transmitting to the user a second mark-up language document having a second plurality of parameters that are selectable by the user, each of the second plurality of selectable parameters having an associated bitmask value;

in response to the user selecting one of the second plurality of selectable parameters of the second mark-up language document, receiving the bitmask value associated with the selected parameter of the second plurality of selectable parameters at the searching program; and causing the searching program to select those data records of the plurality of data records in the main data file that have a bitmask value in a bitmask data field that matches both the bitmask value associated with the selected parameter of the first plurality of selectable parameters and the bitmask value associated with the selected parameter of the second plurality of selectable parameters whereby each data record so selected represents data for which the user searched.

8. The readable media as recited in claim 7, wherein the first and second plurality of selectable parameters are selectable by means of a mouse click.

9. The readable media as recited in claim 7, wherein the first and second plurality of selectable parameters are representative of product descriptors.

10. The readable media as recited in claim 7, wherein the second plurality of selectable parameters comprises a subset of the first plurality of selectable parameters.

11. The readable media as recited in claim 7, wherein the first and second mark-up language documents have links for use in respectively selecting one of the first and second plurality of selectable parameters and the links include the bitmask values associated with the first and second plurality of selectable parameters.

12. The readable media as recited in claim 7, wherein the searching program selects those data records of the plurality of data records in the main data file that have a bitmask value in a bitmask data field that matches the bitmask value associated with the selected parameter of the first plurality of selectable parameters and the data in the data fields of the data records so selected function to define the second plurality of selectable parameters.

13. The readable media as recited in claim 11, wherein the searching program selects those data records of the plurality of data records in the main data file that have a bitmask value in a bitmask data field that matches the bitmask value associated with the selected parameter of the first plurality of selectable parameters and the data in the data fields of the data records so selected function to define the second plurality of selectable parameters.

* * * * *